United States Patent
Furumura et al.

(10) Patent No.: US 8,209,905 B2
(45) Date of Patent: Jul. 3, 2012

(54) GREENING SYSTEM

(75) Inventors: Takashi Furumura, Tokyo (JP); Toshiaki Fukuhara, Tokyo (JP); Shinichi Kawada, Tokyo (JP)

(73) Assignee: Kawada Construction Co., Ltd., Tokyo (JP)

( * ) Notice: Subject to any disclaimer, the term of this patent is extended or adjusted under 35 U.S.C. 154(b) by 590 days.

(21) Appl. No.: 11/242,725

(22) Filed: Oct. 3, 2005

(65) Prior Publication Data
US 2006/0070299 A1 Apr. 6, 2006

(51) Int. Cl.
*A01G 9/02* (2006.01)

(52) U.S. Cl. ......................................... 47/65.9
(58) Field of Classification Search .............. 47/65.9, 47/59 R, 65, 65.5, 66.7, 67, 58.1 SC, 64
See application file for complete search history.

(56) References Cited

U.S. PATENT DOCUMENTS

| | | | | |
|---|---|---|---|---|
| 2,346,029 A | * | 4/1944 | Jennings | 47/80 |
| 3,866,352 A | * | 2/1975 | Herveling et al. | 47/81 |
| 4,034,507 A | * | 7/1977 | Dedolph | 47/65.6 |
| 4,070,794 A | | 1/1978 | Gibbs | |
| 4,073,753 A | | 2/1978 | Hauge | |
| 4,107,876 A | | 8/1978 | Greenbaum | |
| 4,178,715 A | | 12/1979 | Greenbaum | |
| 4,908,984 A | * | 3/1990 | Lenke | 47/65.5 |
| 4,923,329 A | | 5/1990 | Sparfel | |
| 4,926,586 A | * | 5/1990 | Nagamatsu | 47/65.9 |
| 5,277,877 A | | 1/1994 | Jeffrey et al. | |
| 5,403,117 A | | 4/1995 | Okuyama et al. | |
| 5,405,211 A | | 4/1995 | Halwani | |
| 5,437,698 A | * | 8/1995 | Furukawa | 47/65.9 |
| 5,472,458 A | * | 12/1995 | Ogawa et al. | 47/1.01 R |
| 5,608,989 A | | 3/1997 | Behrens | |
| 5,675,929 A | * | 10/1997 | Sontea et al. | 47/18 |
| 5,803,662 A | | 9/1998 | Gunter | |
| 5,816,738 A | | 10/1998 | Harnapp | |
| 6,134,848 A | * | 10/2000 | Walter | 52/63 |

(Continued)

FOREIGN PATENT DOCUMENTS

CN 87207429 9/1988

(Continued)

OTHER PUBLICATIONS

JP 06-153701 translation, retrieved from JP) Feb. 23, 2010.*

(Continued)

*Primary Examiner* — Kristen C Hayes
(74) *Attorney, Agent, or Firm* — Perkins Coie LLP

(57) ABSTRACT

A greening system us disclosed for enabling plants/vegetation to grow only with natural rainfall, without any particular irrigation facilities, enabling a full-blown garden to be constructed on building rooftops, minimizing the applicable loads on the building, and free from the risk of leakage. Planting container 1 comprises box 2 with stickers 3 to carry perforated partition panel 4. The lower half of the container is constituted as water storage 5, and drain holes 6 are opened on sides of the container. Soil layer 7 placed on partition panel 4 is formed of light woody soil-based on charcoal 9 and humus timber chips for absorbing moisture transported from the water 8 stored in water storage 5 by evaporation or difference in humidity, to have a large water capacity letting less water evaporate into the air. Charcoal 9 absorbs water from the air inside the lower half of the container to water the plants. Water storage 5 assures an amount of water necessary for plants to grow.

11 Claims, 16 Drawing Sheets

U.S. PATENT DOCUMENTS

| | | | |
|---|---|---|---|
| 6,263,616 B1 * | 7/2001 | Hummer | 47/65.9 |
| 6,606,823 B1 * | 8/2003 | McDonough et al. | 47/65.9 |
| 6,645,267 B1 * | 11/2003 | Dinel | 71/11 |
| 6,862,842 B2 * | 3/2005 | Mischo | 47/65.9 |
| 2002/0152676 A1 * | 10/2002 | Chan | 47/65.5 |
| 2003/0066238 A1 | 4/2003 | Whisenant | |
| 2004/0237465 A1 * | 12/2004 | Refond | 52/783.11 |
| 2005/0011120 A1 * | 1/2005 | Rajagopalan | 47/67 |
| 2005/0044791 A1 | 3/2005 | Morandini et al. | |

FOREIGN PATENT DOCUMENTS

| | | |
|---|---|---|
| DE | 35 29 717 | 13/1987 |
| DE | 39 36 264 | 15/1991 |
| DE | 33 28 110 | 12/1985 |
| EP | 266701 A2 * | 5/1988 |
| EP | 475489 A1 * | 3/1992 |
| JP | 01-260000 | 10/1989 |
| JP | 3-180119 | 8/1991 |
| JP | 404144611 | 5/1992 |
| JP | 4-106953 | 9/1992 |
| JP | 404347202 | 12/1992 |
| JP | 05095734 A * | 4/1993 |
| JP | 405176640 | 7/1993 |
| JP | 5219845 | 8/1993 |
| JP | 05284857 A * | 11/1993 |
| JP | 6-19423 | 3/1994 |
| JP | 06-153701 | 6/1994 |
| JP | 06-165617 | 6/1994 |
| JP | 06153685 A * | 6/1994 |
| JP | 406153701 | 6/1994 |
| JP | 406165617 | 6/1994 |
| JP | 06-225635 | 8/1994 |
| JP | 406225635 | 8/1994 |
| JP | 8140507 | 4/1996 |
| JP | 8256604 | 8/1996 |
| JP | 8228605 | 9/1996 |
| JP | 9140252 | 6/1997 |
| JP | 10108547 | 4/1998 |
| JP | 11220950 | 8/1999 |
| JP | 11243784 | 9/1999 |
| JP | 2000-104206 | 4/2000 |
| JP | 2000-139229 | 5/2000 |
| JP | 2001-299094 | 10/2001 |
| JP | 2002/212911 | 7/2002 |
| JP | 2002-212911 | 7/2002 |
| JP | 2002/294766 | 10/2002 |
| JP | 2003/158914 | 6/2003 |
| JP | 2003199224 A * | 7/2003 |
| JP | 2004/097235 | 2/2004 |
| JP | 2004/089209 | 3/2004 |
| JP | 2004/089210 | 3/2004 |
| JP | 2004/092390 | 3/2004 |
| JP | PCT/JP2004/008189 | 6/2004 |
| JP | 2004/261021 | 9/2004 |
| JP | 2004-261021 | 9/2004 |
| JP | 2004-290044 | 10/2004 |
| JP | 2004/290044 | 10/2004 |
| JP | 2004/041196 | 12/2004 |
| JP | 2004/337073 | 12/2004 |
| JP | 2004-337073 | 12/2004 |
| WO | WO 2004/110131 | 12/2004 |

OTHER PUBLICATIONS

International Search Report for International Application No. PCT/JP2004/008189, Dated Nov. 9, 2004, 2 page(s).

Gregory Wright, "The Citys Underutilized Rooftop Real Estate as Solar Power Plants, Urban Farms, Sky Parks, and Bird Habitats. Cities are for people—and for Birds", Web based article http://www.sunutility.com/html_pg/city.html, Printed date Apr. 19, 2005, 6 page(s).

* cited by examiner

GREENING SYSTEM

RELATED APPLICATIONS

This application claims priority of PCT application number PCT/JP2004/008189, which was filed on Jun. 11, 2004; which claims priority to JP2003/0169837, which was filed on Jun. 13, 2003; and JP2003/432251, JP2003/432252, JP2003/432253, and JP2003/432254, all of which were filed on Dec. 26, 2003, all of which are hereby incorporated by reference in their entirety.

BACKGROUND

1. Field

The present invention relates to a greening system enabling plants to effectively grow with only minimal natural rainfall or limited irrigation even in the absence of any particular irrigator by making use of water absorbing and releasing capabilities of porous structures such as charcoal perforated with continuous fine capillary tubes, advantageously applicable to greening of roofs, surroundings of buildings, upper surfaces of underground structures, paved streets and/or areas usually lacking in greenery.

2. General Background

As needed for better urban environments, rooftop gardening is increasingly become more in demand with each passing year, not only for the purpose of making existing buildings more energy-efficient as a whole thanks to roof thermal insulation and greater aesthetics but also as expected, to contribute to the achievement of milder climates throughout urban centers thanks to latent heat of gasification associated with transpiration of plants.

However, the conventional method of rooftop greening has traditionally required large-scale structural reinforcement in many cases for existing buildings to bear increased loads associated with massive amounts of soil needed on the rooftop surface, also costing considerably for waterproofing of the roof structure which is permanently supplied with water while preventing future leakage problems.

On the other hand, the layer is much thinner, even with a larger amount of soil than typically found on the ground, losing water much more quickly by evaporation and indispensably requiring irrigation to supply water quite insufficient only from natural rainfall for plants to grow all over the area of rooftop greening.

To realize a greening system with a minimized load on a building, free from risk of leakage and easily irrigated, different methods for rooftop greening have been proposed, making use of planters widely used to grow vegetation anywhere in the absence of gardening soil (e.g. on rooftop, veranda, and paved zones). Greening systems using such planters are structured as disclosed in the following patent documents 1 and 2:

Document 1: Japanese Patent Application Laid Open to the public (KOKAI) No. 9-140252 (see pages 1 to 6, FIGS. 1 to 3); Document 2: Japanese Patent Application Laid Open to the public (KOKAI) No. 10-108547 (see pages 1 to 6, FIGS. 1 to 5).

The conventional greening systems using planters have been installed directly on rooftops or in planter carriers in general. Planters loaded with a limited amount of soil within the container, are easily handled, weigh relatively little, have lower waterproofing costs thanks to the waterproofing capacity of the same planters, and are free from the risk of leakage typically caused by roots breaking into the roof slab.

On the other hand, artificial materials such as gravel or foamed bricks can be chosen instead of natural soil for the so-called "hydro-culture" in the field of indoor gardening with planters for vegetation to grow in any everyday containers. Plants should essentially be supplied with oxygen and water at roots sufficiently enough to avoid root rot or water spot. Plants in planters, perforated for outflow of water exceeding the necessity for roots, are free from the risk of root rot but indispensably need to be frequently irrigated, as lacking in water retention.

On the other hand, plants in hydro-culture can grow, as watered at relatively long intervals (e.g. once every few weeks) but it is important for imperforate containers to split artificial cultivation soil appropriately into the gas and liquid phases, requiring an initial water level strictly adjusted in accordance with kinds of plants and chemical agents to be administered at bottom of each container to prevent root rot or water spot.

To facilitate adjustment of water level in hydro-culture, different containers for indoor gardening have been proposed, as represented by a pot of double or separable structure to have an outer or lower container as a reservoir. Containers for indoor gardening intended for plants in pot culture to be prevented from death or root rot as watered and drained appropriately by bottom irrigation have been proposed by hydro-culture as disclosed e.g. in the following patent documents 3 and 4:

Document 3: Japanese Patent Application Laid Open to the public (KOKAI) No. 5-219845 (see pages 1 to 7, FIGS. 1 to 9); Document 4: Japanese Patent Application Laid Open to the public (KOKAI) No. 8-140507 (see pages 1 to 6, FIGS. 1 to 6).

The above Document 3 discloses an irrigator comprising a bowl with a hole opened at bottom to contain a plant and soil, a saucer to retain water and a bibulous wick to suck up water into the bowl with capillarity, while the above Document 4 discloses a plant cultivator with an irrigator supplying a bowl with water from a basin placed on the lower face.

PROBLEMS TO BE SOLVED BY THE INVENTION

However, the conventional greening system intended to green e.g. a rooftop, evaporating much water, indispensably needs to be frequently irrigated even only on planters, causing problems of costly and complicated procedures as have been pointed out in general. Moreover, the conventional planters are independent containers respectively, enabling only limited kinds of plants to be cultivated, extremely restricted areas to be greened on roofs, and, as a result, no full-dress garden can be constructed on roofs or walkable green belts developed.

Then, for cultivation of plants with automatic watering, the conventional greening system requires irrigation facilities and containers dedicated to it, failing to satisfy the needs for facilitating cultivation of plants anywhere in any region and contributing to greening the region concerned.

On the other hand, devices used in hydro-culture have not been applicable to facilities for outdoor cultivation of common plants, since hydro-culture is relatively easily irrigated, applicable in principle to small-scale cultivation of plants such as indoor gardening, but unfit for outdoor cultivation of plants or cultivation in general of unrestricted kinds of plants.

Greening is now widely demanded not only for building rooftops but also on bridges, paved urban areas, sides of ordinary roads, median strips or upper faces of underground structures. For example, different canals are being embedded underground to utilize the upper surface in increasing cases recently. However, in the presence of a structure such as underground headrace channel, only a limited amount of soil can be used, even if needed to cover the surface, as in the case of roof greening, inevitably requiring costly reinforcement in endurance of the structure, failing to enable economic construction for the tree to grow only with natural rainfall.

On the other and, there have been problems in appropriate water supply even in the case of flowers that do not need the depth of roots as required for trees. In other words, only with natural rainfall, there has been the fear of death of flowers needing relatively much water, since water supply is limited not only on planting strips arranged on the above structure but also on sides of roads surrounded by paved road surfaces, median strips or urban areas.

In other words, planting has been pretty limited in area and kind of plant in accordance with water supplying conditions, as planted flowers solely depend on natural local rainfall mostly flowing away through drainage facilities, even when it rains on the road surface or streets. Therefore, to plant flowers in such areas, there have been problems of costly and complicated procedures for watering operations needed from time to time. Then, there has been no way of water management, in the presence or absence of planting, for guiding rainwater, with widespread clean-up, into drainage or water storage facilities.

SUMMARY OF THE DISCLOSURE

To solve the above problems of the conventional greening system, the present invention offers a greening system for plants to grow only with natural rainfall or limited irrigation in the absence of any particular irrigation facilities, making efficient use of water-absorbing and releasing capacity of porous structures, such as charcoal formed of continuous fine pores.

To solve a specific problem, it offers a greening system alleviating the loading e.g. on a structure and free from the risk of leakage, even in the case of constructing a full-blown garden on rooftop of a building or developing e.g. a walkable greenbelt.

Another problem to solve is to offer a greening system, artificially constructed, with widely applicable containers and as effective as containers, enabling easy cultivation of plants anywhere in any region, advantageously greening e.g. widely paved urban areas on scale.

Another problem to solve is to offer a greening system even for trees planted e.g. at roadside planting strips limited in amount of soil or for flowers needing relatively much water, planted in areas limited in water supply, to grow only with natural rainfall, without any particular irrigation.

To solve the above problems, the present invention relates to a greening system, with a soil layer formed for greening plant to grow in a bottomed container opened on top, equipped with water regulator feeding water necessary for the plant to grow and draining out excess water, characterized in that the container, separated e.g. by a perforated partition panel into upper and lower zones, has drain holes opened on sides on the upper face of the partition panel, a water storage of watertight structure inside the half lower than the partition panel, materials of porous structure formed of continuous fine pores for absorbing water transported from the water storage by evaporation or difference in humidity being contained or laminated in the soil layer placed on the partition panel.

This greening system takes advantage mainly of water moving by difference in relative humidity in the respective layers from the water storage to the surface of the plant, with effects of feeding plants with water, fertilizer, keeping the soil in appropriate temperature, etc.

Mixed into the soil layer or separated into layers, porous-structured material is supposed to supply the plant with absorbed water also letting excess water such as rainwater pass and to purify and drain out e.g. acid rainwater by the filtering effect. The porous-structured material can be e.g. zeolite, porous extrusive such as float stone, perlite, vermiculite, porous ceramic, highly bibulous or hygroscopic sponge, charcoal, activated carbon, artificial lightweight soil or hygroscopic material, water-retaining material, etc. Such materials can be used, e.g. as subjected to photo-catalysis, to purify pooled water.

An example of a container is a lightweight watertight box made of styrene foam or recycled plastic material and an example of perforated partition panel is vinyl chloride plate supported by stickers arranged at bottom. Drain holes are opened immediately under the partition panel to minimize the presence of extra water inside the soil layer. Therefore, the soil layer is usually apart from the water surface. By way of example, waterproof sheet may be stuck inside the half of the container lower than the partition panel to make a watertight structure there or something like sponge capable of retaining water even when vertical may be set there. Optionally, a container structure having the same function may be constructed over a wide range, thanks to a soil layer.

The partition panel has holes also to guide the direction in which roots are being established and the holes should preferably be positioned as determined for sound growth of roots in accordance with each species of plant. Then, a water storage portion and a portion to contain a soil layer of earth brought from elsewhere, made separately in two different containers, may be combined to make a container.

An exemplary container in a greening system is characterized that it has a drainage formed with walls made of highly water-permeable material on sides in the vicinity of the upper face of the partition panel and a watertight structured water storage to embed underground in the lower half below the partition panel inside the container.

The container can be e.g. a reinforced-concrete box and the perforated partition panel can be e.g. precast-concrete perforated plate or porous concrete plate. The walls serving as drainage can be e.g. a water-permeable structure e.g. made of porous concrete for the drainage to work not only for draining out extra water to outside but also for guiding rainwater into the water storage. To that effect, rainwater gutters can be arranged to be connected with the drainage or penetrating water on the road surface can be collected e.g. with a waterproof sheet to be introduced into the water storage. Then, underground penetrating water from the surrounding ground or water from conduits can be collected and utilized.

A greening system may have a soil layer formed for greening plant to grow in a bottomed container opened on top and is equipped with a water regulator feeding water necessary for the plant to grow and draining out extra water. It is a greening system characterized in that the container has a watertight-structured water storage all over the lower half of the container, spacers made of highly water-permeable material stacked at least up to the level higher than the upper end of the water storage, drainage provided on side faces for draining out excess water over the water storage, materials of porous structure formed of continuous fine pores for absorbing water evaporating from the water storage being contained or laminated in the soil layer placed on the upper face of the spacers, interposing a highly breathable sheet. Then, the sheet can be made of material constituting a filter layer having the same function.

Spacers can be made of any material, if only highly water-permeable and capable of support a soil layer, e.g. resin conduit collecting and draining material, porous concrete or any other perforated solid. A highly breathable sheet, for example, should be made of material capable of preventing the carried soil from falling into the water storage and enabling passage of water evaporating from the water storage. The drainage should preferably arranged higher than the water storage and lower than the soil layer to minimize the presence of extra water inside the soil layer.

The container in a greening system may have a watertight-structured water storage formed with watertight sheet extended all over the lower half, drain holes opened at bottom or on sides for draining out water overflowing from the water storage and the spacers are stacked at least up to the level higher than the upper end of the watertight sheet. This is applicable to wide-spreading greening e.g. in riverbed, park, etc. constructing a similar structure using an impermeable layer or a soil layer capable of storing water.

The container can be formed in any shape or of any material, if only allowing e.g. watertight sheet to be extended over the lower half and a soil layer to be placed on the upper face of the spacers. It means that it can be made of not only styrene foam or plastic materials but also wood, metal, concrete, etc. and can be formed as a box shaped like a rectangular parallelepiped, cylinder, semi-sphere or the like.

For example, the watertight sheet should be shaped to be capable of being extended along the surface in the lower half of the container, arranging a waterway, in the case of drain holes at bottom, for smooth down-flow of overflowing water. The waterway is formed e.g. by inserting e.g. a pipe between a watertight sheet and the inner face of the container. Drain holes, if ready made as in existing planters, are used as they are or a container, if imperforate, should be perforated as needed. For drain holes, an air layer is formed lower than the soil layer to minimize the presence of extra water inside the soil layer.

The container in a greening system in accordance with this disclosure may carry a net on small water-storing containers arranged in parallel on bottom face, with drain holes opened on bottom or side faces for draining out water overflowing from the small containers, porous-structured material formed of continuous fine pores for absorbing water evaporating from the water storage being contained or laminated in the soil layer placed on the upper face of the net, interposing e.g. a highly breathable sheet on the upper face of the net. The small container must be a diameter to the extent that the net to be carried is not loosened. The net is to partition between the water storage of the small containers arranged in parallel and the soil layer. The net is of solid material.

The porous-structured material in a greening system of this disclosure may be based on charcoal of carbonized plywood collected from building rubble wasted in construction work. For example, plywood formwork wasted in construction is reused, considering its affections to the environment, and is put into a carbonize, instead of being burnt to make synthetic regenerated charcoal. It should preferably be calcined in carbonization at a temperature on the order of 1300° C. Harmful substances such as cadmium, arsenic, etc. remain in charcoal in higher concentrations, when calcined at a temperature on the order of 700° C., while they are all removed on the order of 1300° C. Synthetic regenerated charcoal is effective to fill holes of the partition panel, thanks to the plate-like characteristics, preventing unnecessary things from falling from the soil layer to the water storage. Then, further atomized, it becomes like needles to have a larger specific inner superficies. Charcoal can be optionally laid as sacked.

The soil layer in a greening system in accordance with this disclosure may be formed of light woody soil based on mixture of charcoal and humus timber chips to have a large water capacity letting less water evaporate into the air. It should preferably be light soil containing 5% high temperature calcinated charcoal, 5% middle temperature calcinated charcoal, 70% humus timber chips, and 20% palm fibers, perlite, vermiculite, peat moss, red beads soil, black soil, etc. optionally blended with seashells, leaf mold, porous extrusive, hygroscopic, water-retaining materials, gross grain soil such as light soil, etc.

The greening system may also include a charcoal layer interposed between the soil layer and the partition panel. As the charcoal layer retains a constant amount of water, stepwise absorption or release of water is attained to limit unnecessary water supply.

The soil layer in a greening system may interpose a charcoal layer enveloped by a highly breathable sheet, laying charcoal pieces, as sacked.

The water storage in a greening system in accordance with this disclosure may have a capacity for storing an amount of water necessary for the plant to grow with natural rainfall during a year. The soil layer is adapted to have a large water-retaining capacity letting less water evaporate, while water at the water storage is consumed only as absorbed e.g. by charcoal. No other irrigator is needed here, only storing natural rainfall, as the water storage stores an amount necessary for the plants to grow. Further, there is no need for periodical watering if in usual climates. For example, the depth of the water storage should be 5 cm to put a soil layer 5 cm thick.

A plurality of containers in a greening system may be arranged in parallel on a roof slab of a rooftop of a building for the drain holes to be communicated with one another and that the containers are placed on crossbeams as supported by girders constituting the rooftop slab.

They are supported on spacers arranged on girder in order to prevent the containers from weighing on the floor of the rooftop slab lacking in tolerance of load. The crossbeams are arranged at appropriate intervals to enable the respective containers to support the loading. Drain holes are communicated for quick drainage of extra water to outside. Then, spacers formed like rubber shoes can be effective in earthquake control for the entire building.

The loading is thus adapted to weigh directly on a major member of the structure, which needs no particular reinforcement, if strong enough by itself. It requires no particular reinforcement to waterproof the floor surface either. Then, it is applicable to existing buildings, regardless of the scale.

The plurality of containers in a greening system may include a level-adjusting plate interposed between the containers and the crossbeams, also fixing a bulk-increasing band around the containers, to enable the soil layer to vary in thickness and height.

To use e.g. styrene foam containers, the plate and the band made of styrene foam too, arranging the respective containers close to one another, with the band adhesively fixed. As the soil layer is variable in thickness and height, it can be continuously used as a plane all together, walkable, planted e.g. with grass, not only with bushes like azaleas but also middle and high trees, also allowing a slope to be formed to construct a full-blown garden on a rooftop of a building.

A greening system in accordance with the present disclosure may be a soil layer formed for greening plant to grow, equipped with a water regulator feeding water necessary for the plant to grow and draining out extra water, and is characterized in that the water storage comprises a perforated lid to carry a planting soil layer at least either containing or laminating porous-structured material formed of continuous fine pores and a water storing container having notches for overflow, vertical gutters continuous with the notches on sidewalls and push-ups for drainage formed longitudinally and transversely on bottom face, and inner walls projected from the lower face of the perforated lid or the inner face of the water storing container to abut the water storing container or the lid, also having an opening for water to pass through.

The water-storing container can be anything having notches, vertical gutter and push-ups, without any particular limitation in shape, material or combination. It can be any box made of any material such as styrene foam, plastic material, wood, metal, concrete, etc. and formed into different shapes such as a rectangular parallelepiped, cylinder, semi-sphere, etc. Excess water overflows by the notches to separate the soil layer and the water surface. Overflowing water follows the vertical gutter to flow down on the foundation, passes the push-ups for drainage to flow down to outside.

Holes, as many as appropriate for the soil not to drop into the water-storing container, are opened on the lid for water such as rainfall passing through the soil layer to drip down into the water-storing container as well as water evaporating from the water-storing container to be absorbed by the porous-structured material. Then, the inner walls, reinforced for the lid to support the weight of the soil layer are constructed to abut the water-storing container or the lid to keep them in tight position to each other. The opening, arranged to uniform water dripping into the water-storing container, is placed and shaped, as selected in order to have no problem in supporting the loading.

A greening system in accordance with the present disclosure may comprise a gutter-shaped zone, placed on sides of paved road surface, arranging reservoirs in parallel on bottom face and disposing porous-structured material formed of continuous fine pores where apart from the water surface of the reservoirs; drainage lead-in for introducing into the gutter-shaped zone from paved road surface or gutters; a soil layer, placed on the upper face of the porous structure, for greening plants to grow; and an outflux of purified water overflowing from reservoirs after purified by the porous-structured material.

To arrange the porous-structured material where apart from the water surface, the reservoir comprises e.g. spacers made of highly water-permeable material, stacked up higher than the upper end of the container, to carry on the upper face of the spacers the porous-structured material, interposing a highly breathable sheet. Then, the reservoir can also comprise a net placed on small water-storing containers on bottom face and porous-structured material on the upper face of the net, interposing highly breathable sheet or can be constructed to comprise drainage on sides of a reservoir carrying a perforated lid and the porous-structured material placed on the lid. In either case, the water face and the porous-structured material should be separated from each other to minimize the presence of water inside the porous-structured material and the soil layer.

The paved road surface can be positioned on one side face or both side faces of the gutter-shaped zone. The gutter-shaped zone comprises at least a wall to contain the porous-structured material formed of continuous fine pores and the soil layer to draw drained water into the porous-structured material. Then, a pipe, perforated as appropriate to supply the porous-structured material with drained water uniformly, can be arranged on the upper face of the porous-structured material.

Rainwater on the surface of a paved road such as national highway, express highway, etc. frequently used for the passage of vehicles, is contaminated with various things such as dirt, dust, suspended solids, friction debris of tires and paved asphalt, oil, etc., flowing out of such road areas to cause also water pollution in public waters. The porous-structured material works also as a filter to purify such water to feed plants, flowing down out of the areas.

The outflux of purified water in a greening system in accordance with the present disclosure may include an underground headrace channel arranged on the lower face of the gutter-shaped zone and the top plate of the underground headrace channel has holes for flowing down the purified water and feeding water evaporating from the underground headrace channel to the porous-structured material. Purified water overflowing from the reservoir is transferred from the holes to the underground headrace channel to flow down, while water vapor inside the headrace channel passes through the holes to be absorbed by the porous-structured material to be water for growth of plants. The underground headrace channel can be arranged on sides of a paved road surface or at median strip or may be arranged all over the paved road surface.

ADVANTAGEOUS EFFECTS OF THE INVENTION

As explained above, in an embodiment of the greening system of the present disclosure, the container can be separated by a perforated partition panel into upper and lower zones to use the lower half as a water storage and the soil layer carried on the upper face contains or laminates porous-structured material formed of continuous fine pores for absorbing water evaporating from the water storage, supplying plants with absorbed water, while letting extra water such as rainwater pass by to work as a filter to drain out e.g. acid rainwater as clean water, alleviating affections to environment or to human bodies.

The greening system according to the present disclosure, comprising a structure with underground-embedded water storage is applicable also e.g. to large-scale greening of streets, enabling rainwater to be guided into the water storage.

The greening system may include spacers made of highly breathable material containing or laminating porous-structured material, permitting a soil layer apart from a water storage tank to or even in the absence of a perforated partition panel between the soil layer and the water storage, with enlarged applicability of containers.

The greening system in an embodiment may have water storage with watertight sheet extended over the lower half of the containers, permitting use of common containers and enabling growth of plants anywhere in any region.

The greening system may include, e.g. a net placed on water-storing small containers arranged in parallel, enabling formation of water storage even without spacers or watertight sheet to support a soil layer.

Porous-structured material in an embodiment of the greening system may be carbonized plywood or the like wasted in construction work. It is not only ecological but also advantageous in plate-like charcoal easily filling the holes of the partition panel, preventing unnecessary things from falling from the soil layer to the water storage.

The soil layer in an embodiment of the greening system may be is a woody light soil layer based on mixture of charcoal and humus woodchips having a large water capacity letting less water evaporate into the air, enabling plants to grow with a little water supply.

A charcoal layer is interposed between the soil layer and the partition panel in an embodiment of the greening system retain a constant amount of water, absorbing and releasing water stepwise, limiting unnecessary water supply, with effects of feeding plants with water, fertilizer or cooling the soil, thanks to water moving by difference in relative humidity in the respective layers from the water storage to the surface of the plant and to capillarity of evaporated water.

A charcoal layer enveloped by highly breathable sheet is interposed in the soil layer in an embodiment of the greening system to absorb and release water stepwise, limiting unnecessary water supply.

The greening system may have water storage of sufficient capacity to store a necessary amount of water for the plants to grow with natural rainfall during a year, only needing to store natural rainwater and no other particular irrigator, even without periodical watering if in usual climate.

In the greening system of an exemplary embodiment, a plurality of containers are placed on crossbeams as supported on girders constituting a roof slab for drain holes to be communicated with one another in order to prevent the containers from weighing on the floor of the rooftop slab lacking in tolerance of load. Then, the loading is directly imposed on the main members of the structure of the building, requiring no particular reinforcement, if the members are strong enough. As the drains are communicated with each other, extra water is discharged quickly and it is of no need to reinforce waterproofing of the floor. It is therefore easily applicable to existing buildings, regardless of the size of scale.

A level-adjusting plate is interposed between the plurality of containers and the crossbeams, also fixing bulk-increasing band around the container, in an embodiment of the greening system, enabling variation in thickness and height of the soil layer and utilization as a plane all together, making it walkable e.g. planted with grass, allowing not only bushes like azaleas but also middle-sized trees to be planted, also enabling formation of slopes to construct a full-blown garden on a rooftop of a building.

In an exemplary embodiment of the greening system, extra water overflows by notches to assure the soil layer and the water surface to be separated from each other. Then, overflowing water follows a vertical gutter to flow down on the foundation and can flow down smoothly to outside via push-ups for drainage. The inner wall is reinforced to support the loading of the soil layer, while water dripping down into the water storing container is made uniform thanks to the presence of an opening Rainwater passing through the soil layer drips down into the water-storing container through holes opened on the lid, while the porous-structured material absorbs water evaporating from the water-storing container through the same holes.

In the greening system of an exemplary embodiment, purified water is used efficiently thanks to the porous-structured material and the soil layer carried by the water-storing container for greening plants to grow, enabling plants to grow only with natural rainfall, without any particular irrigation, even for trees to grow in roadside areas lacking in amount of soil or even for flowers needing relatively much water to grow in areas limited in water supply.

In the greening system of an exemplary embodiment, an underground headrace channel is used as an outflux of purified water, contributing to improvement of water quality inside the headrace as well as utilizing water vapor inside the headrace for plants to grow.

DRAWINGS

The above-mentioned features and objects of the present disclosure will become more apparent with reference to the following description taken in conjunction with the accompanying drawings wherein like reference numerals denote like elements and in which.

REFERENCE NUMERALS OF THE DRAWINGS

Figure 1:
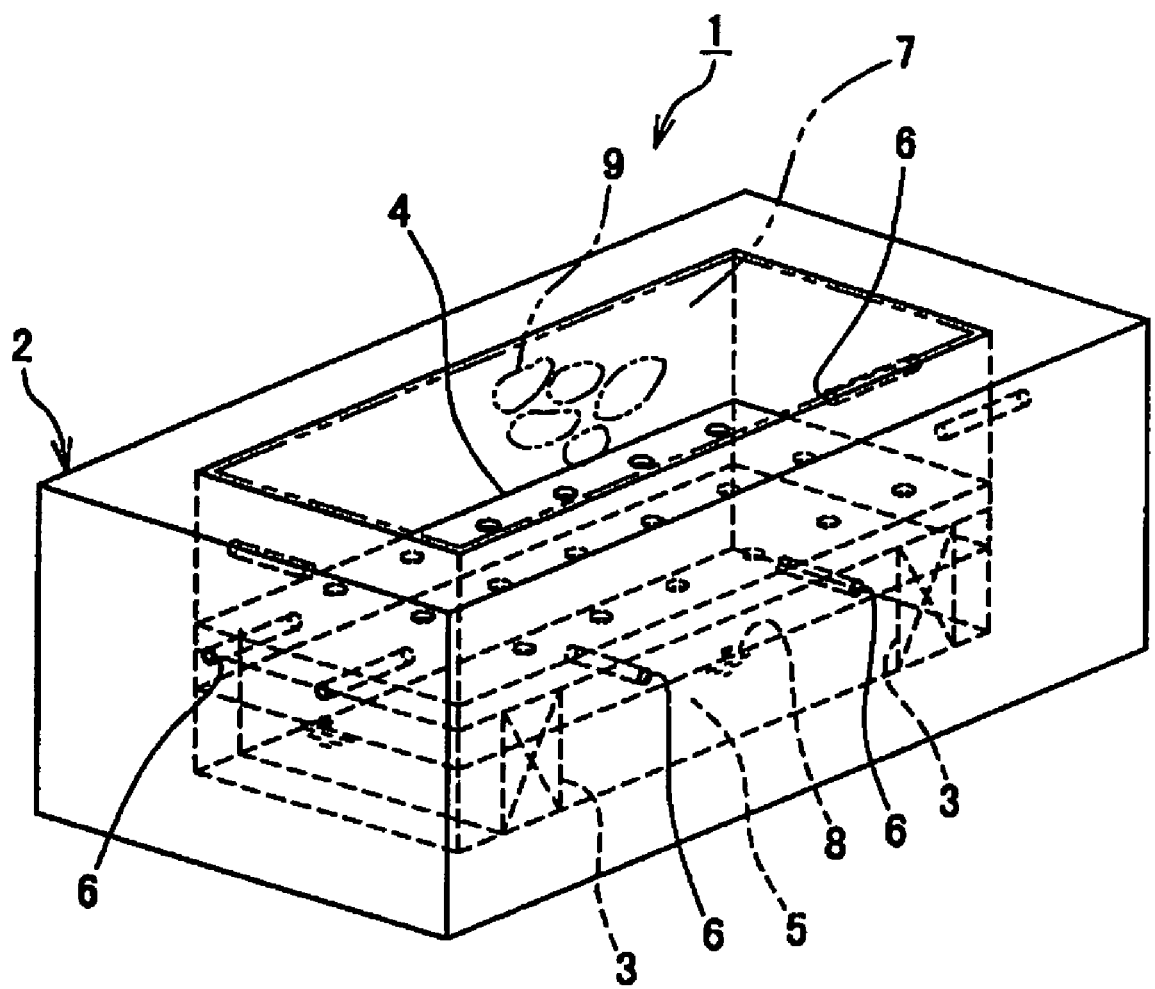
FIG. 1 is a perspective view of a planting container.

1. Planting container
2. Box
3. Stickers
4. Perforated partition plate
5. Water storage
6. Drain hole
7. Soil layer
8. Water
9. Charcoal

DETAILED DESCRIPTION

The mode of realization of the invention will be explained in detail, referring to drawings attached herewith. FIG. 1 shows a perspective view of a planting container on which a greening system is based. Planting container 1 comprises styrene foam box 2 opened on top and with stickers 3 at bottom carrying perforated partition panel 4 of polyvinyl chloride between the top and bottom. The container is covered on the inner surface with non-illustrated waterproofing sheet below the partition panel 4 to form watertight water storage 5. Planting container 1 is sized in principle to be 100 cm wide×50 cm deep×20 cm high, made of members 10 cm thick, but can be smaller or larger.

The container has a necessary number of drain holes 6 opened on sides immediately above partition panel 4 for quickly draining out water in excess over partition panel 4. Then, charcoal pieces 9 are embedded in soil layer 7 placed on partition panel 4 to absorb water evaporating from water 8 stored in water storage 5. Then, soil layer 7 may be clearly separated into a charcoal layer and a layer of brought from elsewhere.

Soil layer 7 is formed of light woody soil e.g. based on non-illustrated humus timber chips mixed with such charcoal 9 to have a large water capacity letting less water evaporate into the air. Plants for greening, non-illustrated, are planted in the above soil layer 7, usually separated from the surface of water storage 5 but absorbing water with embedded charcoal pieces 9 from the air inside the lower half of the container to water the plants.

Water storage 5 assures an amount of water necessary for plants to grow during a year, as supplied mainly from rainfall, avoiding the necessity of being watered periodically in usual climates from any other irrigator, only being nourished by water collected from natural rainfall.

Charcoal pieces 9 mixed into soil layer 7 should preferably be based on carbonized plywood or stickers. Re-use of carbonized laminated wood collected from building debris from construction work as advantageous not only in consideration of the environment but also effective in efficient use of the plate-like characteristics to fill holes of partition panel 4, preventing unnecessary things from falling from soil layer 7 to water storage 5. Then, recycled carbonized laminated wood, further atomized, are formed like needles to have a larger specific inner superficies, better absorbency and a proven absorption capacity of 10% or more for charcoal to absorb water vapor. As a result, it transpires when dry and is hygroscopic when wet, with a high water regulating capacity by natural breathing, as well as excellent in soil improvement and sewage clean-up.

Figure 2:
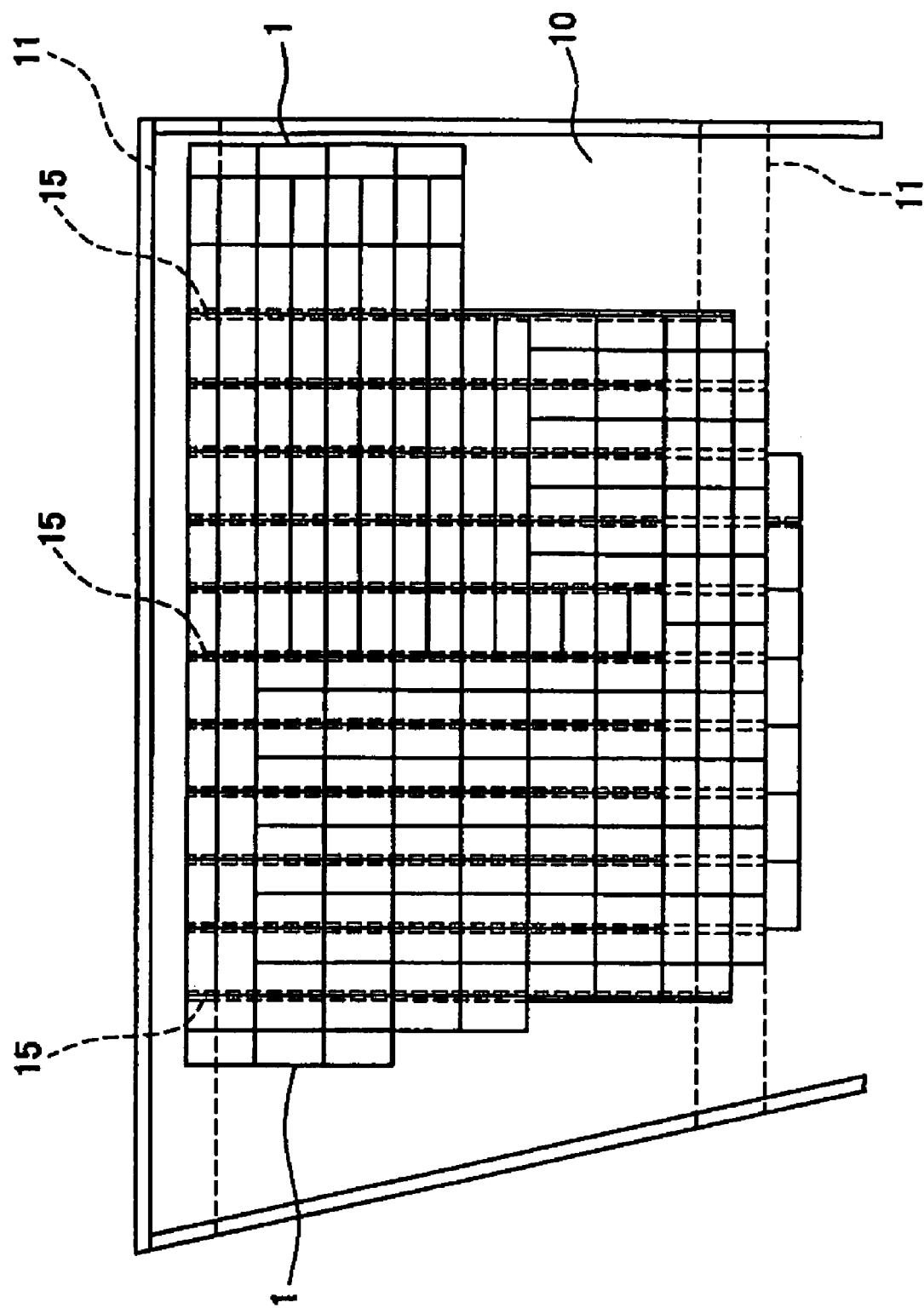
FIG. 2 is a schematic plane view of a roof greening plan.
Figure 3:
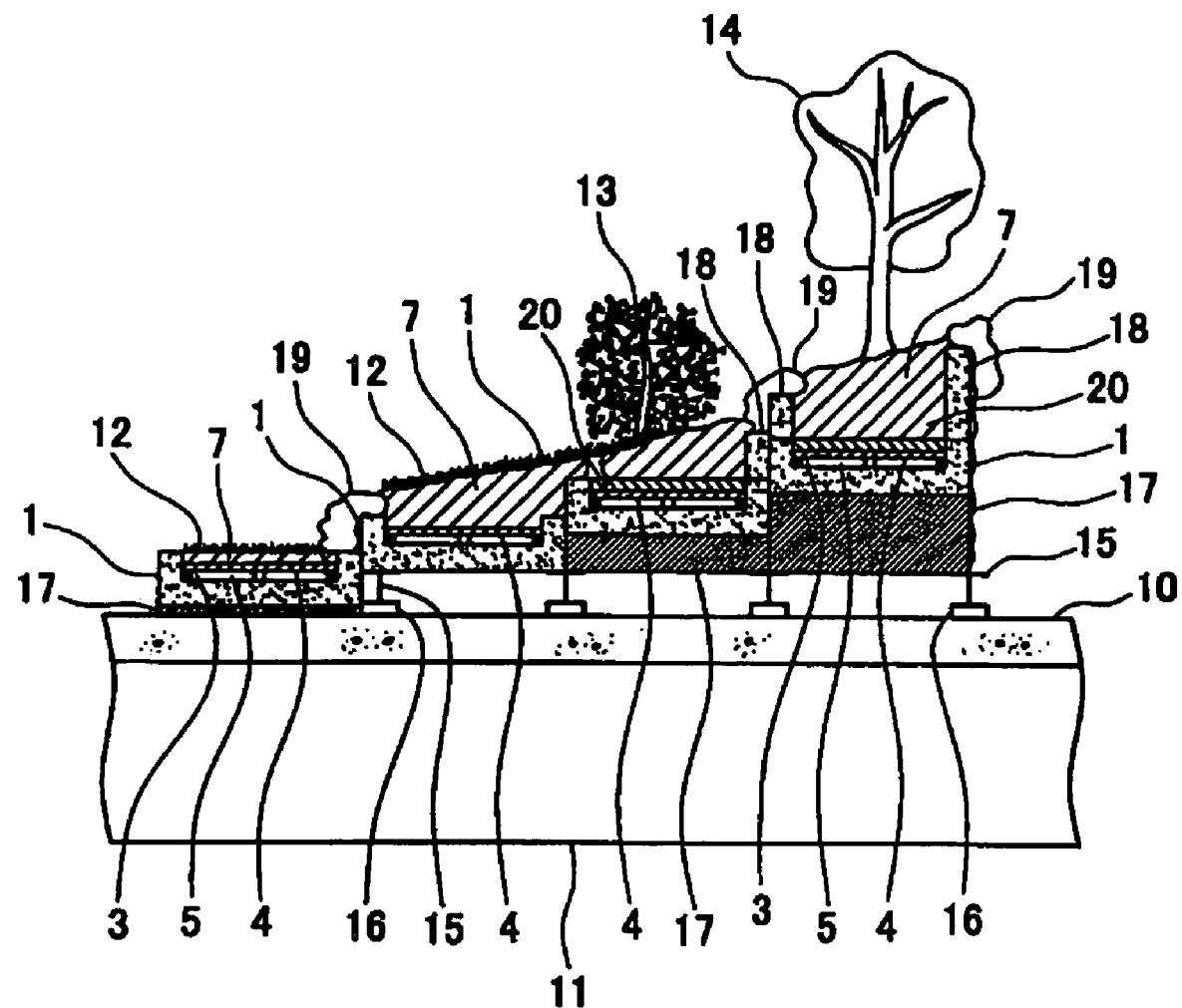
FIG. 3 is a schematic sectional view of a roof greening plan.

A case of roof greening with use of this planting container 1 is shown in FIGS. 2 and 3. FIG. 2 is a schematic plane view and FIG. 3 is a schematic sectional view of the roof greening plan to construct a promenade with planting containers 1, non-illustrated wooden decks, etc. placed where appropriate on the roof.

This roof is coated on rooftop slab 10 with a non-illustrated waterproofing layer or a coating layer of protecting concrete, surrounded by a protective barrier or a fence. Planting containers 1 are placed tentatively between girders 11 of rooftop slab 10 but small and light ones can be anywhere on the floor. Then, the planting containers 1 can carry not only chamaephyte like grass but also flowers 12 as well as shrubbery 13 like azaleas or middle-sized trees 14 like maple.

Planting containers 1 are arranged for adjacent drains to communicate with each other for quickly discharging extra water, as guided into drains via non-illustrated ditches or piping connected to outer drains. As the greening system is waterproofed by planting containers 1, no particular improvement or reinforcement is required to waterproof the rooftop, no roots are likely to break directly into rooftop slab 10 either and there is no concern about leakage in the future at least due to the greening system.

A plurality of planting containers 1 should be placed on crossbeams 15; however, as supported on spacers 16 arranged on girder 11 in order to prevent the containers from weighing on the floor of rooftop slab 10 lacking in tolerance of load. Spacers 16 are pads of plate-shaped rubber to avoid damaging rooftop slab 10. Then, crossbeams 15 can be made from steel, wood or any other material but should be arranged at appropriate intervals to allow planting containers 1 to support the load.

The loading is thus adapted to weigh directly on girder 11 (i.e. a major member of the structure), which needs no particular reinforcement, if strong enough by itself. Watering, needed only in the case of shortage of stored water (e.g. due to unusual weather), is monitored by water-level gauges appropriately installed on planting containers 1, even though this greening system can be supported only by natural rainfall in principle.

As shown in FIG. 3, plates 17 are interposed as needed between crossbeams 15 and planting containers 1 to adjust levels of and downs in a garden, while bands 18 to increase the bulk are fixed around the containers to add variations in thickness and height of soil layers 17 and bands 18 are made of styrene foam, with a plurality of variations in thickness to enable adjustment in height, are arranged closely to one another and fixed with adhesive, bolts or mounting hardware.

Imitation stones 19 or non-illustrated bricks or natural stones are arranged where appropriate for continuous use of all together as a plane, with crossbeams 15, plates 17 and planting containers 1 secured to one another by non-illustrated means of attachment.

In this greening system, charcoal layer 20 constant in water capacity is interposed in soil layer 7 above partition panel 4 to enable stepwise absorption or release of water to limit unnecessary water supply, serving also as a filter for acid rain, air pollution rain, etc. to store or discharge purified water, thereby alleviating affections of environment or people's health.

Figure 4:
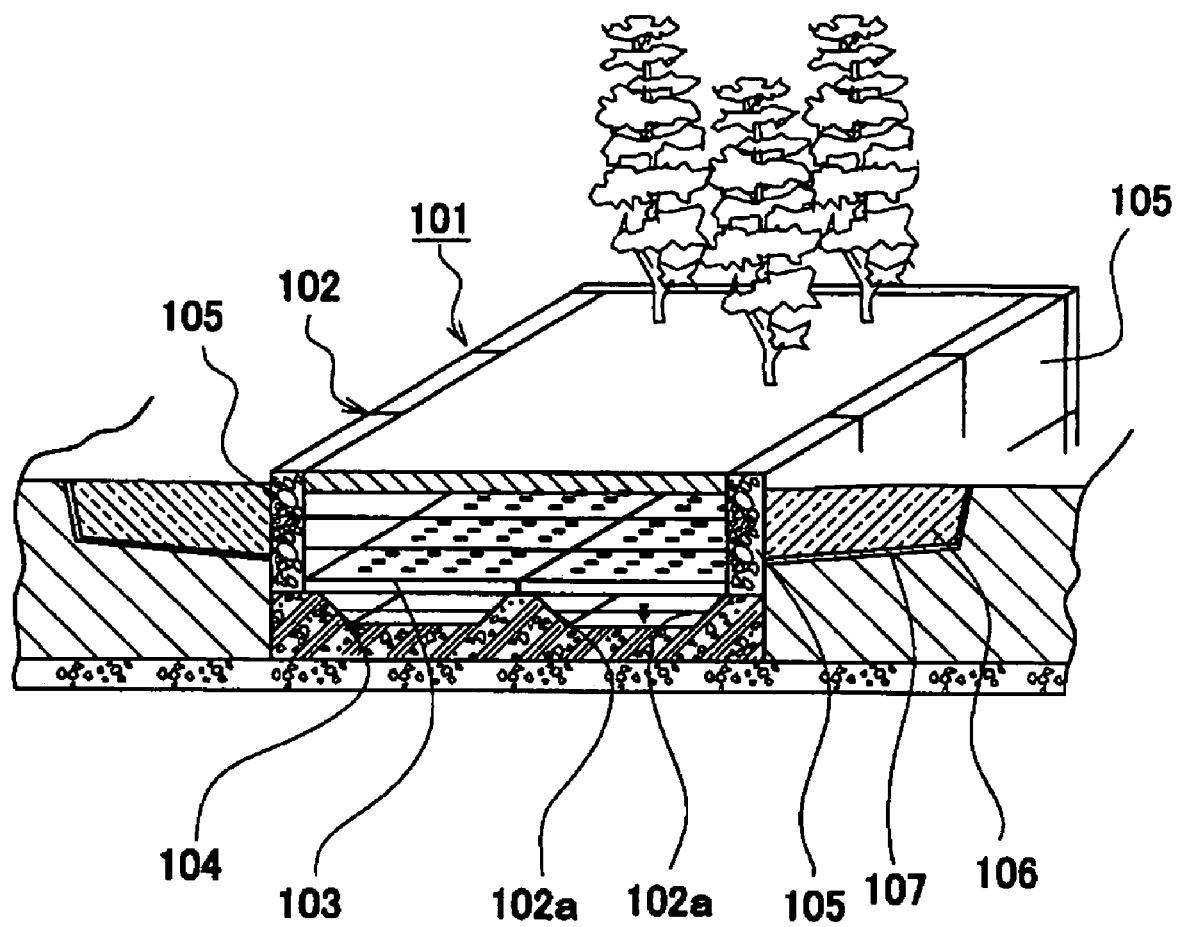
FIG. 4 is a perspective sectional view of an underground-embedded planting container omitting a part of the soil layer.
Figure 5:
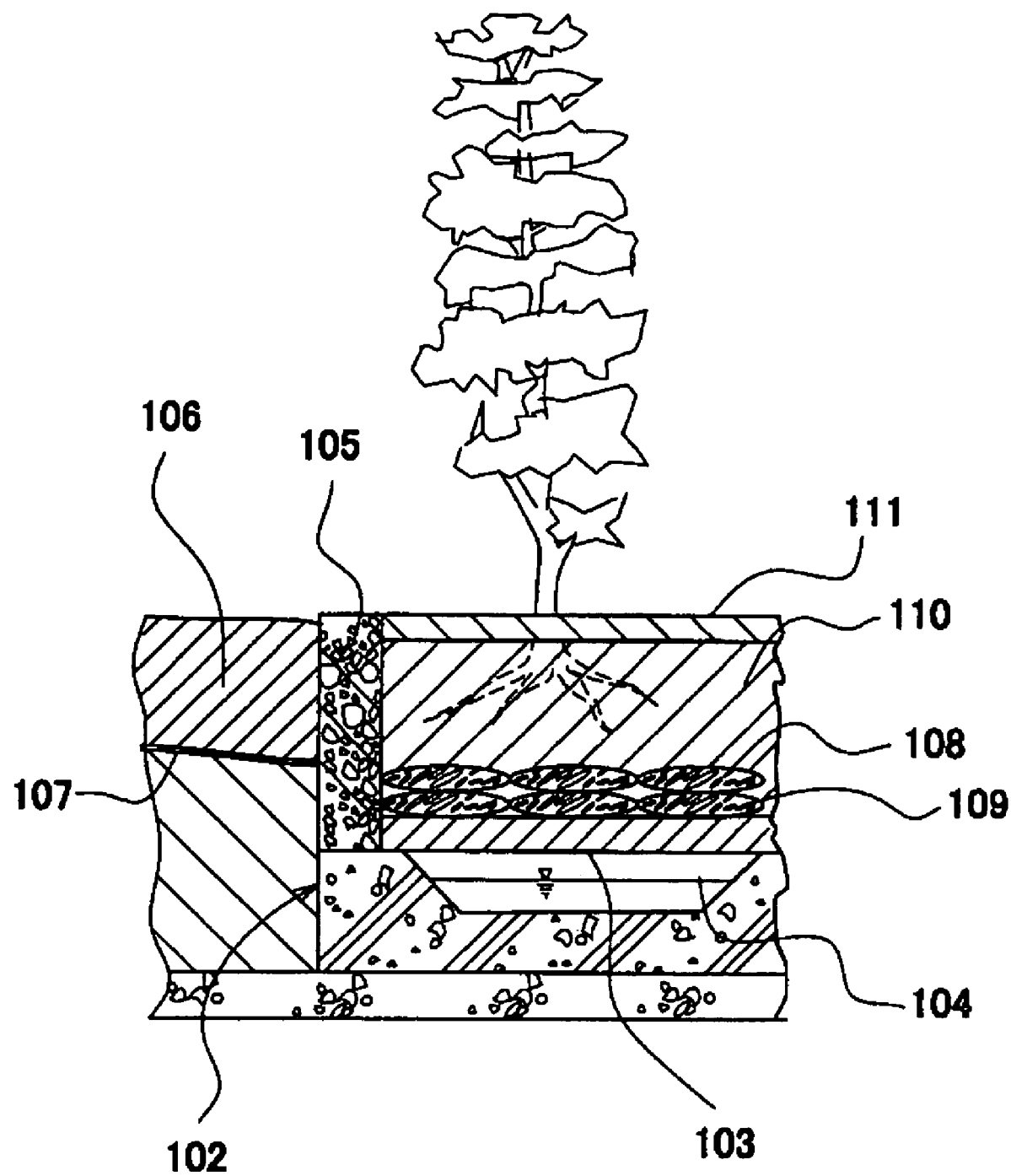
FIG. 5 is a partly enlarged sectional view of an underground-embedded planting container.

Another mode of realization of the greening system with larger containers will be explained here below, referring to FIGS. 4 and 5. FIG. 4 is a perspective sectional view of an underground-embedded planting container omitting a part of the soil layer and FIG. 5 is a partly enlarged sectional view of an underground-embedded planting container. Planting container 101 comprises reinforced concrete box 102 opened on top and with supports 102a at bottom to carry perforated pre-cast concrete partition panel 103 between the top and bottom. A watertight structure of water storage 104 is formed inside the lower half of this container below the partition panel 103.

Water storage 104 is embedded underground, while wall 105 upper than partition panel 103 is a water-permeable structure (e.g. made of porous concrete). Wall 105 serves also to drain out extra water overflowing from water storage 104, while guiding rainwater into water storage 104. To that effect, wall-side cavity 106 is refilled with gross-grain soil, with waterproofing sheet 107 laid at bottom to collect penetrating water there.

The upper face of partition panel 103 carries a soil layer formed of charcoal layer 109 enveloped by highly breathable sheet 108, humus soil 110 placed on this upper face and surface layer 111 covered by woodchips or grass. Water storage 104 stores rainwater penetrating from surface layer 111, collecting also water penetrating from the surrounding ground to assure a sufficient amount of stored water.

Figure 6:
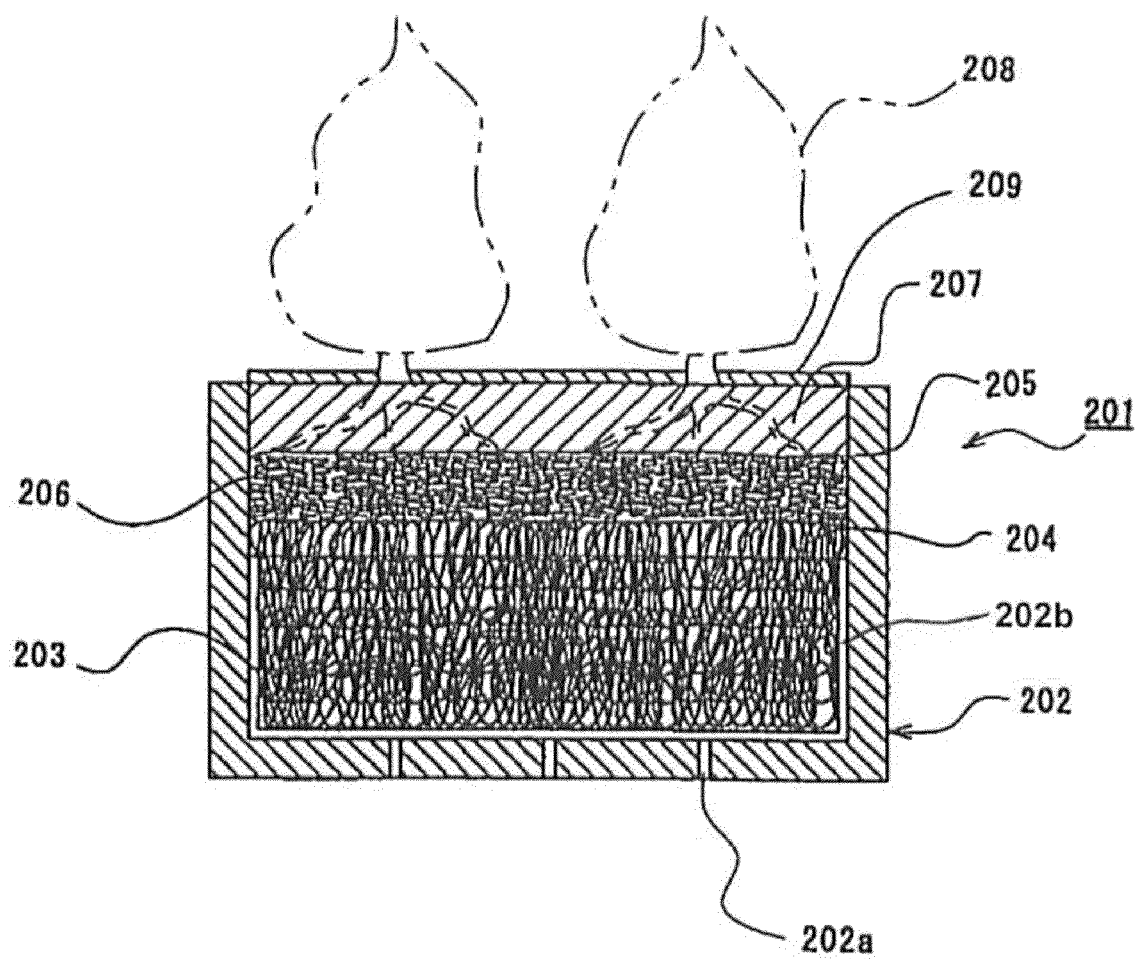
FIG. 6 is a sectional view of a planting container using spacers.

The above explained planting container is divided into upper and lower zones, by a perforated partition panel or optionally a spacer instead, in order to use the lower half as water storage, as realized in the mode as shown in FIG. 6 showing a section of a planting container using a spacer. Planting container 201 comprises a bottomed container 202 with its upper face opened, watertight sheet 203 expanded over the lower half of the container, spacer 204 laid up to the level higher than this upper end, charcoal layer 206 enveloped by highly breathable sheet 205 and soil layer 207 placed on this upper face.

Not only ready-made planters but also any boxes in all shapes and of any material can be used as planting container 201, opening drain hole 202a where appropriate, if not opened beforehand. An example of watertight sheet 203 is polypropylene or synthetic rubber waterproofing or water-barrier sheet for all boxes to have a water storing function.

Drain hole 202a which leads to a drainage path 202b should be opened lower than charcoal layer 206, trying the best to prevent charcoal layer 206 from being drenched in water.

An example of spacer 204 is resin conduit drainage basin material. It should be porous, highly water-permeable and little deformable to the loading as a whole. Charcoal can be mixed into soil layer 207, however, laying a highly breathable sheet over the boundary with spacer 204.

The surface of soil layer 207 planted with greening plants 208 can be optionally covered with something water-permeable, moisture-proof to the soil such as chamaephyte, woodchip pavement, different mulches 209, releasing little water into the air.

Figure 7:
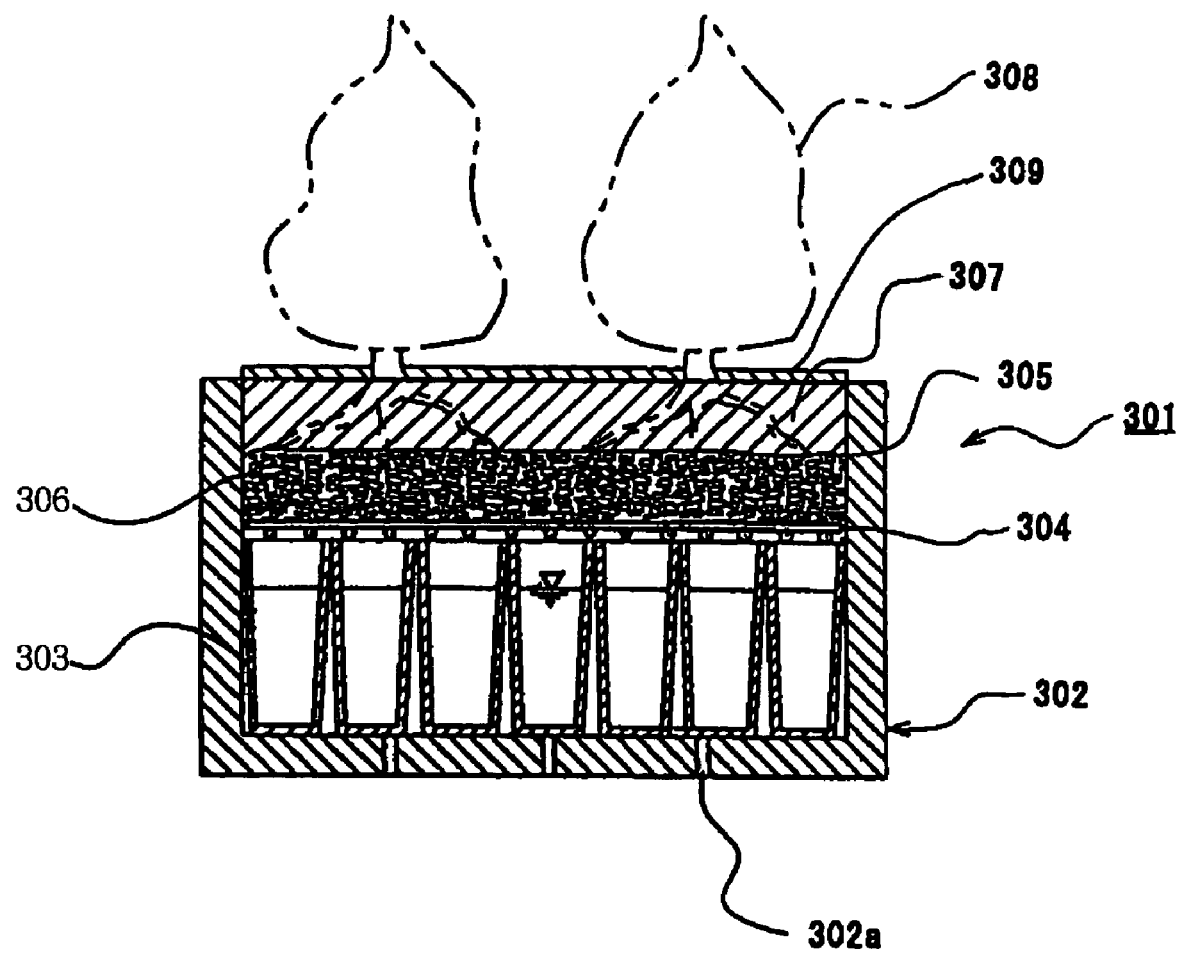
FIG. 7 is a sectional view of a planting container comprising water-retaining small containers arranged in parallel.

Then, a planting container comprising a plurality of small containers arranged in parallel for water storage will be explained, referring to FIG. 7 showing a section of such a container. Planting container 301 comprises bottomed container 302 opened on top, water storing small containers 303 arranged in parallel inside the container, net 304 placed on the small containers 303, water-retaining layer 306 made of fine continuous porous structured mineral enveloped by highly breathable sheet 305, and soil layer 307 placed on the upper face of the water-retaining layer.

Planting container 302 has drain holes 302a to drain out water overflowing from small containers 303, soil layer 307 planted with greening plants 308 and different mulches 309 on the surface.

Figure 8:
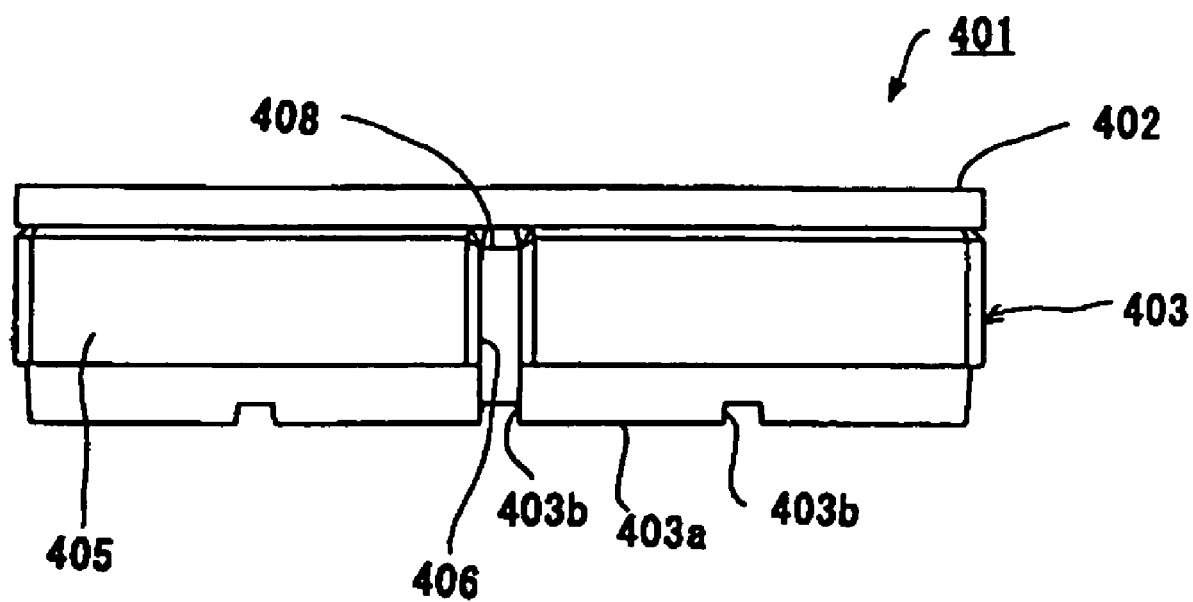
FIG. 8 is a front view of a reservoir for planting.
Figure 9:
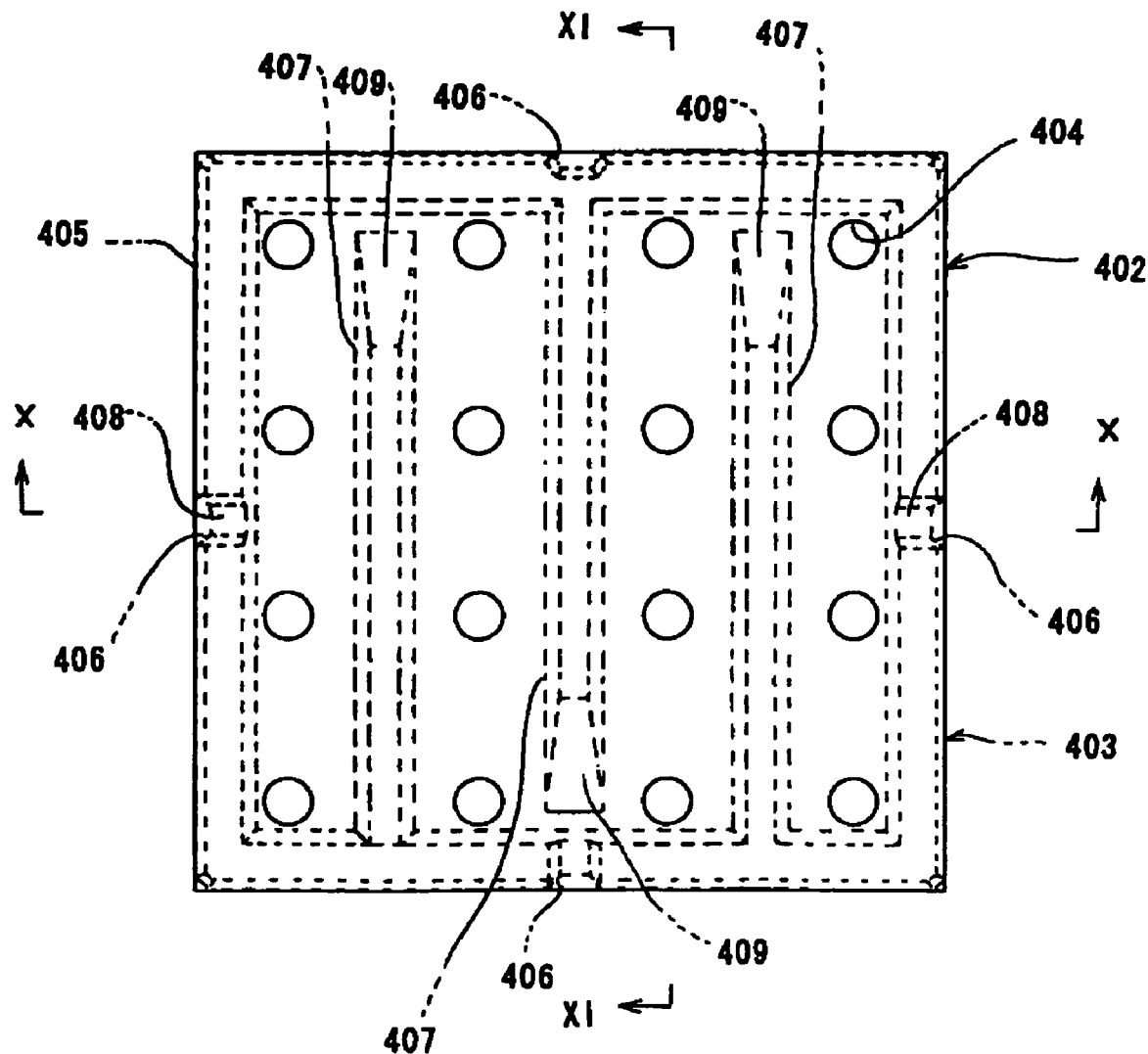
FIG. 9 is a plane view of a reservoir for planting.
Figure 10:
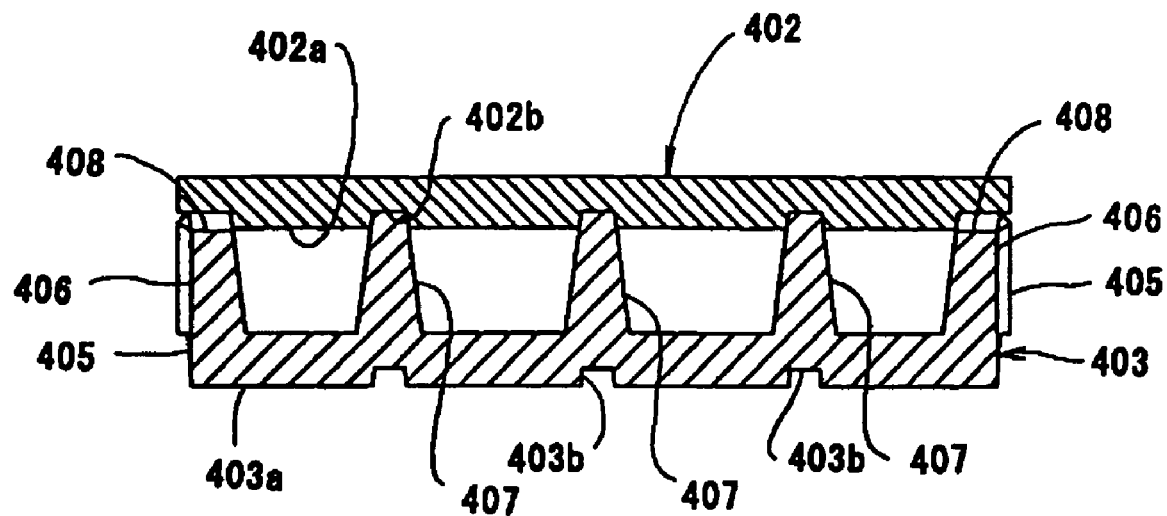
FIG. 10 is a sectional view of FIG. 9 cut along a line X-X.
Figure 11:
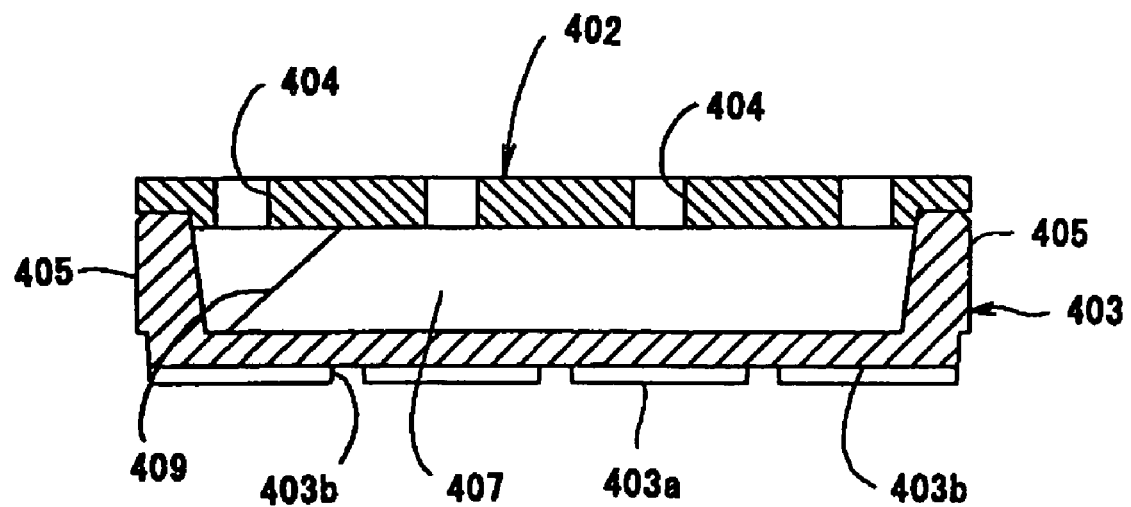
FIG. 11 is a sectional view of FIG. 9 cut along a line XI-XI.

Then, a mode to realize a plant-cultivating reservoir advantageous for greening system will be explained in detail, referring to drawings here attached. FIG. 8 is a front view; FIG. 9 is a plane view; and FIGS. 10 and 11 are respectively sectional views of FIG. 9 cut along X-X or XI-XI. Reservoir 401 comprises styrene foam lid 402 with a plurality of orifices 404 and water storing container 403. Vertical gutter 406, made at the center of each sidewall 405 of water-storing container 403, has notch 408 for overflow on top except for a joint for inner wall 407. Inner wall 407, level with sidewall 405, has slope 409 formed at the border in staggered arrangement as an opening for water flow. Lid 402 has gutter 402b formed on back face 402a to fit the top of inner wall 407. The level of back face 402a is set to be somewhat higher than the level of the bottom of notch 408 for overflow. Water storing container 403 has push-ups for drainage 403b formed longitudinally and transversely on bottom face 403a.

How to use the reservoir will be explained, referring to FIGS. 12 and 13.

Figure 12:
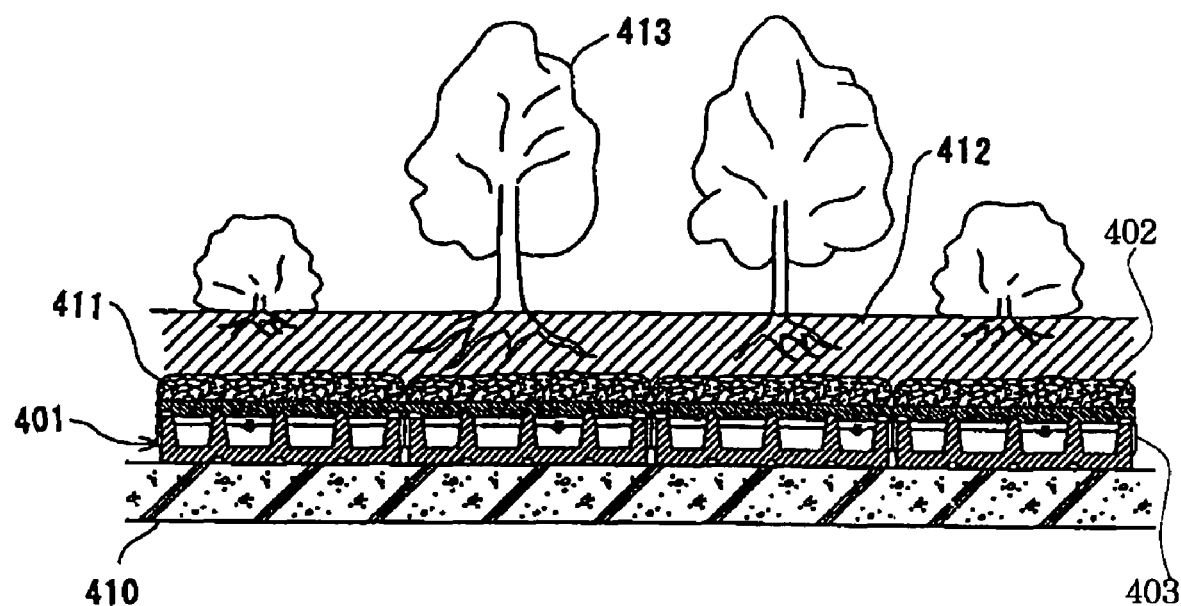
FIG. 12 is a sectional view to show reservoirs embedded under soil layers planted with trees.
Figure 13:
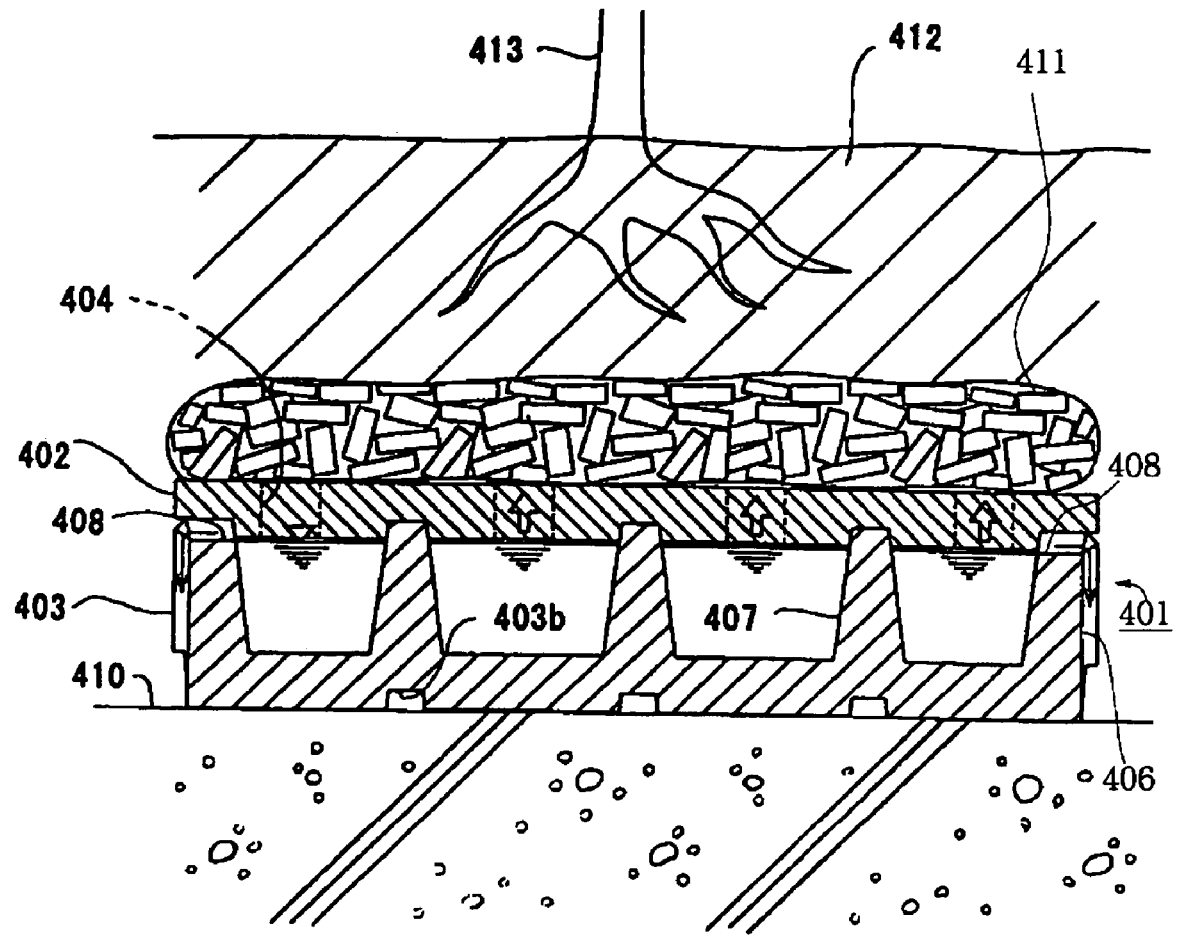
FIG. 13 is a partly enlarged sectional view to show reservoirs embedded under soil layers planted with trees.

FIG. 12 is a sectional view as crowned with a soil layer planted with trees and FIG. 13 is a partly enlarged sectional view of the same. On the upper face of reservoirs 401 arranged in parallel on structure 410 or e.g. on a paved face, charcoal pieces 411 enveloped by highly breathable sheet and soil 412 retaining much water but evaporating little water into the air are placed for greening plants 413 to grow there.

When it rains, reservoir 401 stores water as purified, passing through soil 412 and charcoal pieces 411. Extra water spills from notch 408, passes vertical gutter 406 to structure 410 and flows down to outside via push-ups for drainage 403b. Orifices 404 opened on lid 402 drips e.g. rainwater, while letting charcoal pieces 411 absorb water evaporating from water-storing container 403.

Figure 14:
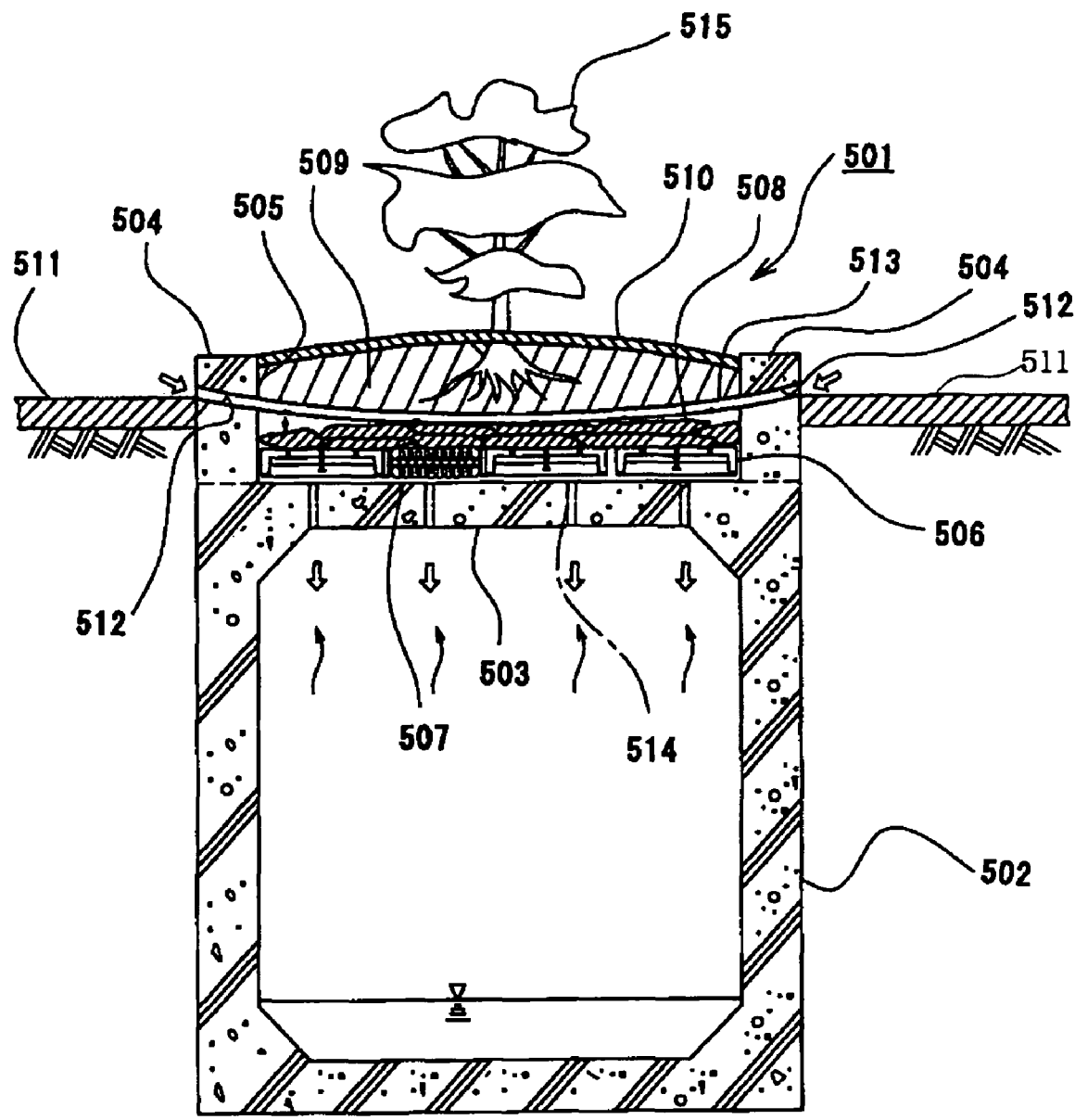
FIG. 14 is a sectional view of a road surface drainage cleaning and greening system using a reservoir.

Then, a greening system using reservoirs to purify road surface drainage and the purified water for plants to grow will be explained, referring to FIG. 14 showing a sectional view of the greening system using such reservoirs. Road surface drainage and greening system 501 forms gutter-shaped zone 505 with a pair of walls 504, 504 opposed to each other standing from top plate 503 of underground headrace channel 502. Walls 504 can be constructed integrally with underground headrace channel 502 or optionally coupled with separate plates, e.g. with non-illustrated anchor bars embedded in top plate 503.

On the bottom face of gutter-shaped zone 505, perforated lidded reservoirs 506 or reservoirs 507 containing spacers are arranged in parallel to carry on the upper face charcoal layers 508 enveloped by highly breathable sheet. On the upper face of the charcoal layers 508 soil layer 509 retaining much water but evaporating little water into the air is formed, with the surface layer covered e.g. with chamaephyte woodchips pavement, different mulches 510, etc.

Overflow e.g. of rainwater on paved road surfaces 511, 511 on both sides of gutter-shaped zone 505 is collected by leader head 512 provided at wall 504, guided into pipe 513 perforated where appropriate, and fed into the charcoal layer. Charcoal 508 filters and purifies the water. Top plate 503 of underground headrace channel 502 has orifices 514 through which extra water overflowing from reservoirs 506, 507, as purified by charcoal 508, flows down into underground headrace channel 502.

Soil layer 509 is planted with greening plants 515. Charcoal purifies incoming water, while absorbing water evaporating from reservoirs 506, 507, to feed greening plants 515. Orifices 514 opened on top plate 503 feed water evaporating from underground headrace channel 502 to charcoal 508. In other words, water in underground headrace channel 502 is used for plants to grow too.

Figure 15:
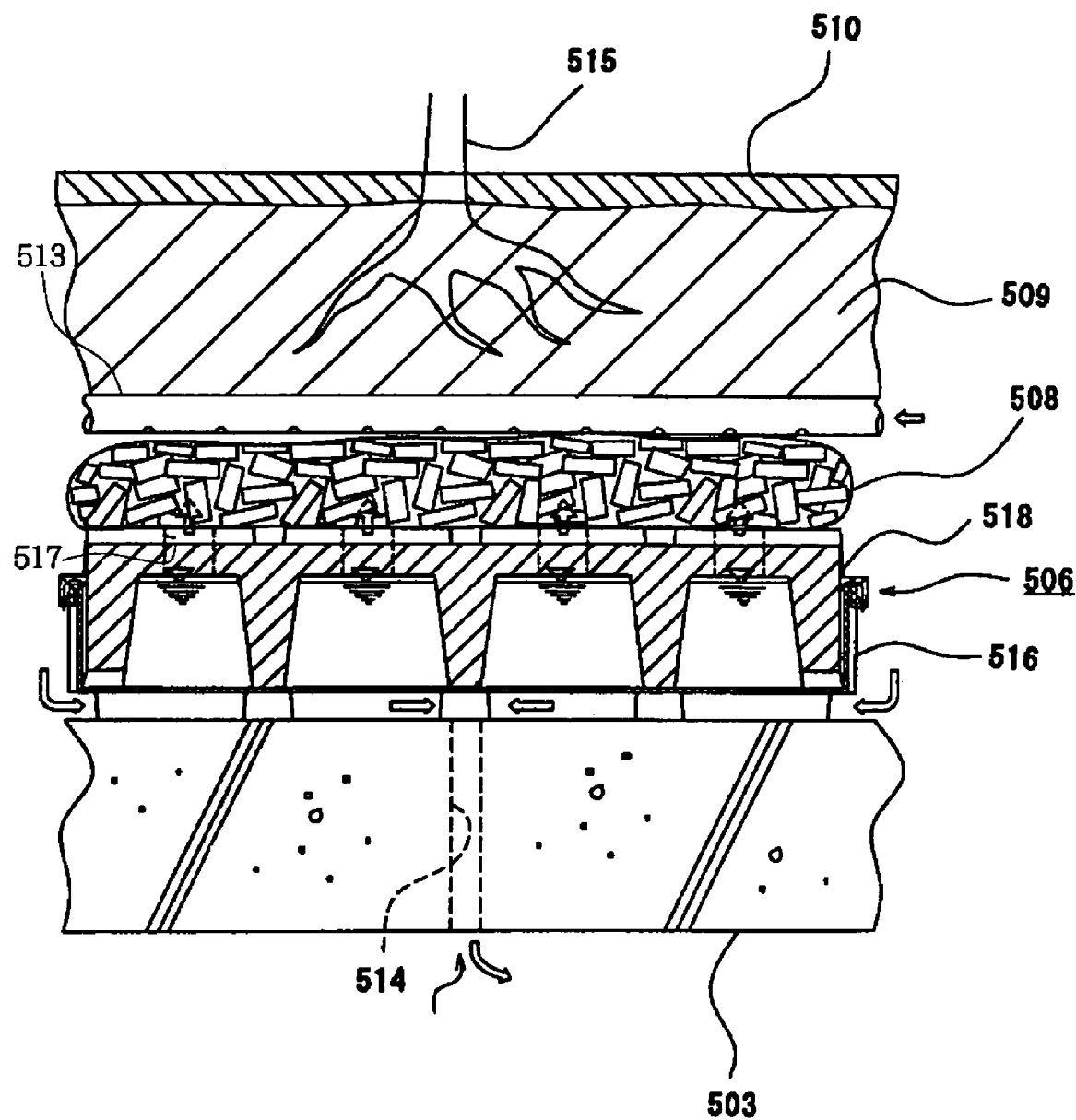
FIG. 15 is a sectional view of a reservoir having a perforated lid.
Figure 16:
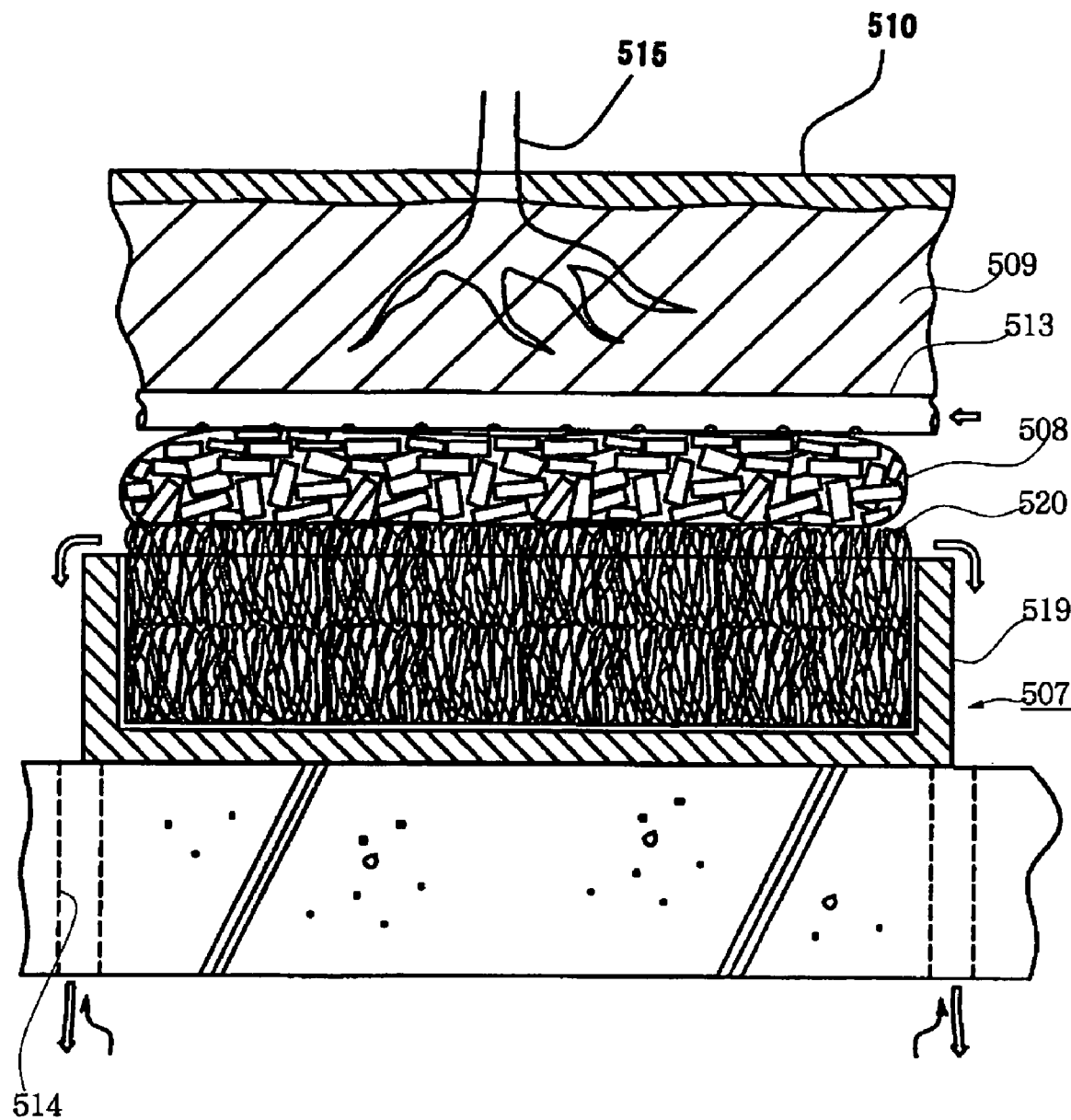
FIG. 16 is a sectional view of a reservoir containing spacers.

Then, reservoirs will be explained in detail, referring to FIGS. 15 and 16. FIG. 15 is a sectional view of a reservoir with a perforated lid. FIG. 16 is a sectional view of a reservoir containing spacers. Reservoir 506 comprises plastic container 516 with notches where appropriate on sides and styrene foam lid 518 with orifices 517, for extra water upper than lid 518 to be quickly drained out to outside. Charcoal 508 placed on the upper face of lid 518 absorbs water from the air inside container 516 to feed plant 515. Container 516 stores rainwater penetrating soil layer 509 and extra water on paved road surface 511 fed from pipe 513, both as purified, thereby supplying a necessary amount of water for plant 515 to grow during a year.

On the other hand, reservoir 507 comprises spacers 520 made of resin conduit drainage basin material, stacked up higher than the upper end of container 519. Water inside container 519 is separated from charcoal by the presence of spacers 510, thereby allowing the scope of application of container 519 to be widened as wide as desired In other words, a predetermined type of reservoirs 506 having lid 518 are arranged in parallel in gutter-shaped zone 505, while reservoirs 507 containing spacers 520 are inserted where it fails to cover.

Figure 17:
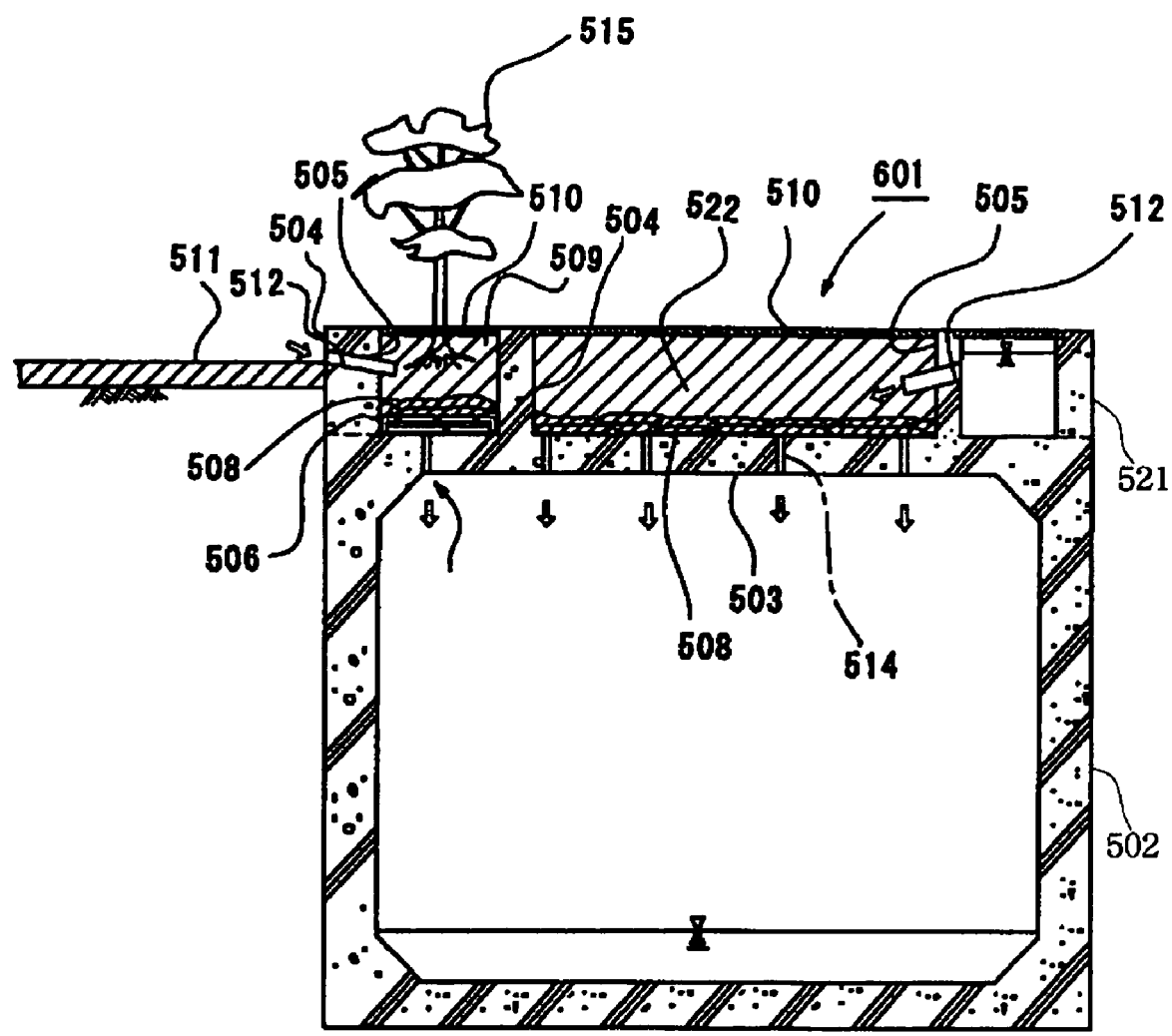
FIG. 17 is a sectional view of another mode of road surface drainage cleaning and greening system.

Then, another mode of realization is explained, referring to FIG. 17 showing a sectional view of the road surface drainage cleaning and greening system according to the mode of realization. Incidentally, elements constructed and working similarly as shown in FIG. 17 are denoted with identical numerals also in FIG. 17, omitting detailed explanation. Road surface drainage and greening system 601 forms two separate gutter-shaped zones 505, as shown in FIG. 17, with walls 504 standing from top plate 503 of underground headrace channel 502 and gutter 521.

Foundation is constructed with antiseptic chips 522 excellent impermeability in drainage, where there is no plant cultivation in gutter-shaped zones 505 to pave the surface with woodchips 510, hereby making a woody footway gentle to walking feet. Planting pelts can be thus arranged in parallel to the footway serving with its lower face as a greening system.

Road surface drainage and greening system 601 installed on of underground headrace channel 502 as shown in FIG. 17 is applicable also to usual footways or median strips having no structure under the surface.

INDUSTRIAL APPLICABILITY

This greening system is not only applicable to rooftop greening, greening of bridges, paved streets and areas, the upper surface of canals such as underground sewerage, reservoirs, etc. but also helpful to clean up surface drainage e.g. on driveways.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A greening system, with a soil layer formed for a plant to grow in, the greening system having a container with an open top, comprising:
   a watertight water storage space in the container, the water storage space having an upper end;
   water permeable and substantially non load-deformable spacers positioned in the water storage space and stacked at least up to a level higher than the upper end of the water storage space, a topmost one of the water permeable spacers having an upper face;
   a breathable sheet on the upper face of the topmost water permeable spacer, on which the soil layer is placed;
   drain holes at a bottom of the container to drain out water overflowing from the water storage space and maintain a water level in the water storage space below the upper end of the water storage space;
   a layer of porous materials between the water storage space and the soil layer, so that the water storage space is separated from the soil layer; and
   with the watertight water storage space formed of a watertight sheet extended all over the lower half of the container, and the spacers stacked at least up to a level higher than the upper end of the watertight sheet.

2. The greening system according to claim 1, characterized in that the layer of porous materials comprises charcoal of carbonized plywood or wood pieces collected from building construction debris.

3. The greening system according to claim 1, characterized in that the layer of porous materials comprises charcoal of carbonized plywood or wood pieces collected from building construction debris.

4. The greening system of claim 1 with the soil layer comprising a woody soil based mixture including charcoal and humus timber chips.

5. The greening system according to claim 1, characterized in that the water storage space has a capacity of storing an amount of water necessary for the plant to grow with natural rainfall during a year.

6. The greening system according to claim 1, characterized in that the water storage space has a capacity of storing an amount of water necessary for the plant to grow with natural rainfall during a year.

7. The greening system of claim 1 with the spacers comprising resin conduit.

8. The greening system of claim 1 with the spacers comprising porous concrete.

9. A greening system comprising:
   a container having a bottom, and an open top;
   a watertight storage space in the container holding water;
   a plurality of individual and substantially non load-deformable water permeable spacers positioned side-by-side in the storage space and extending in a straight line up and out of the storage space, with upper ends of the permeable spacers above the storage space;
   a layer of porous materials on top of the water permeable spacers;
   a breathable sheet on top of the layer of porous materials;
   a soil layer on the breathable sheet; and
   with the storage space formed from a watertight sheet in a lower part of the container, with the bottom of the container having drain holes for draining out water from the storage space and the spacers stacked at least up to the level higher than the upper end of the watertight sheet.

10. The greening system of claim 9 with the layer of porous materials comprising charcoal of carbonized wood.

11. The greening system of claim 9 with the soil layer comprising a light woody soil based mixture of charcoal and humus timber chips.

* * * * *

UNITED STATES PATENT AND TRADEMARK OFFICE
CERTIFICATE OF CORRECTION

PATENT NO. : 8,209,905 B2  
APPLICATION NO. : 11/242725  
DATED : July 3, 2012  
INVENTOR(S) : Takashi Furumura et al.

It is certified that error appears in the above-identified patent and that said Letters Patent is hereby corrected as shown below:

Title page, between (65) and (51), add  
-- (30) Foreign Application Priority Data  
Jun. 11, 2004 (WO).....................PCT/JP2004/008189  
Jun. 13, 2003 (JP).......................2003-169837  
Dec. 26, 2003 (JP).......................2003-432253  
Dec. 26, 2003 (JP).......................2003-432252  
Dec. 26, 2003 (JP).......................2003-432254  
Dec. 26, 2003 (JP).......................2003-432251 --

Signed and Sealed this  
Ninth Day of October, 2012

David J. Kappos  
*Director of the United States Patent and Trademark Office*